(12) United States Patent
Kwolek

(10) Patent No.: US 7,631,917 B2
(45) Date of Patent: Dec. 15, 2009

(54) VEHICLE SHIFT/CONSOLE ARRANGEMENT

(75) Inventor: Chad Kwolek, Hartland, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 468 days.

(21) Appl. No.: 11/478,523

(22) Filed: Jun. 30, 2006

(65) Prior Publication Data

US 2008/0001422 A1 Jan. 3, 2008

(51) Int. Cl.
*B60R 27/00* (2006.01)
(52) U.S. Cl. .................................. 296/24.34; 74/473.1
(58) Field of Classification Search .............. 296/24.43, 296/37.1, 37.8, 37.12, 37.14, 1.07, 1.08; 74/473.1; 180/315, 320, 326
See application file for complete search history.

(56) References Cited

U.S. PATENT DOCUMENTS

| 5,335,751 | A | * | 8/1994 | Kuroki | 180/336 |
|---|---|---|---|---|---|
| 5,462,146 | A | * | 10/1995 | Doolittle et al. | 192/218 |
| 5,887,485 | A | * | 3/1999 | VanOrder et al. | 74/473.15 |
| 5,970,814 | A | * | 10/1999 | Smith et al. | 74/473.15 |
| 6,167,772 | B1 | * | 1/2001 | Wakabayashi | 74/469 |
| 6,267,217 | B1 | * | 7/2001 | Malone et al. | 192/218 |
| 7,028,574 | B1 | * | 4/2006 | Bell et al. | 74/473.15 |
| 2007/0176448 | A1 | * | 8/2007 | Spykerman et al. | 296/24.34 |

* cited by examiner

*Primary Examiner*—Patricia L Engle
*Assistant Examiner*—Sunsurraye Westbrook
(74) *Attorney, Agent, or Firm*—Global IP Counselors, LLP

(57) ABSTRACT

A vehicle includes console/shifter arrangement includes a vehicle floor, a shifter base member and a console. A shifter base member has oversized fastening apertures arranged to align with threaded apertures in the vehicle floor. Fasteners extending through the oversized fastening apertures engage the threaded apertures and are moveable between an adjusting orientation and a securing orientation. The oversized fastening apertures have a prescribed dimension with respect to the fasteners such that the shifter base member is movable in alignment directions relative to the vehicle floor with the fasteners in the adjusting orientation. The console and the shifter base member are configured to move together as a single unit in the alignment directions while the fasteners are in the adjusting orientation.

22 Claims, 14 Drawing Sheets

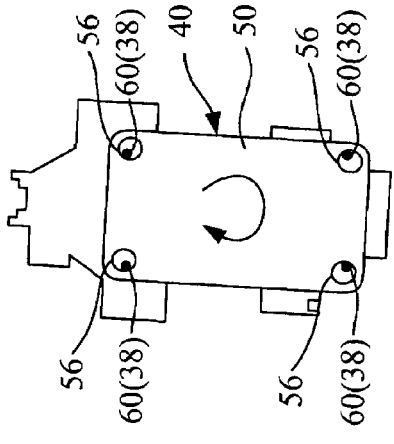
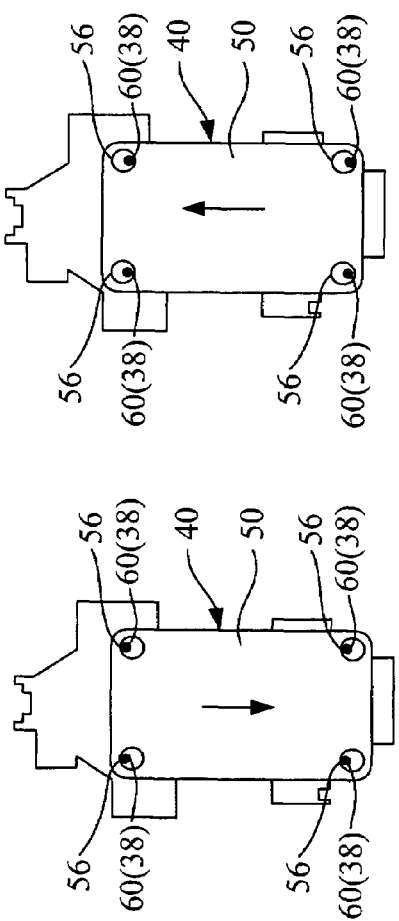
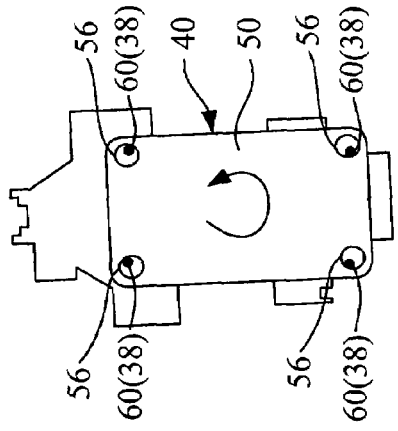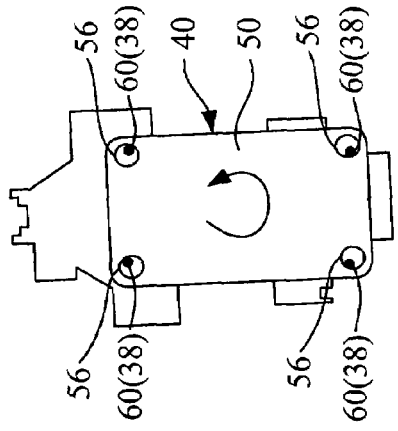
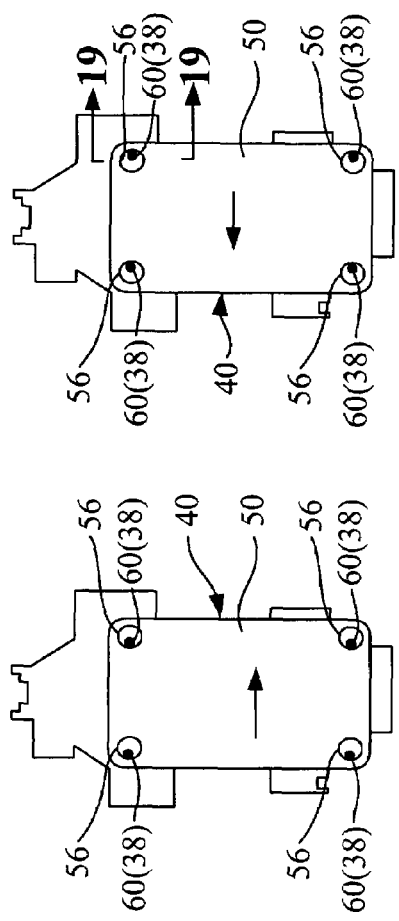

VEHICLE SHIFT/CONSOLE ARRANGEMENT

BACKGROUND OF THE INVENTION

1. Field of the Invention

The present invention generally relates to vehicle console/shifter arrangement. More specifically, the present invention relates to a vehicle console/shifter arrangement in a vehicle where a center console is aligned with at least one feature of an instrument panel.

2. Background Information

Improvements to vehicle manufacturing and assembly techniques are routinely being made. Such improvements often include changes to methods and also to design of parts used in the assembly of portions of vehicles.

Installation of interior components that are fixed to the floor and/or frame of a vehicle are a challenge as a result of routine engineering tolerances. For example, predetermined alignment of mating components may require special installation procedures to overcome conventional engineering tolerances and ensure an aesthetically pleasing final appearance. Such special installation procedures slow down production and increase production costs.

In view of the above, it will be apparent to those skilled in the art from this disclosure that there exists a need for improved installation procedures relating to mating components in order to improve production. This invention addresses this need in the art as well as other needs, which will become apparent to those skilled in the art from this disclosure.

SUMMARY OF THE INVENTION

It has been discovered that in order to improve assembly and manufacture of vehicles, it is desirable to make installation of mating components simple and flexible.

One object of the present invention is to improve manufacturing operations in the assembly of vehicle interior components.

Another object of the present invention is to improve the appearance of mating interior components by making position adjustments of interior components easy and simple to effect.

In accordance with one aspect of the present invention, a vehicle console/shifter arrangement includes a vehicle floor portion, a shifter base member, a plurality of second fastener parts and a console member. The vehicle floor portion has a plurality of first fastener parts spaced apart from one another in a first mounting pattern. The shifter base member has a plurality of first alignment portions and a plurality of oversized fastening apertures arranged in a second mounting pattern that align with the first mounting pattern. The second fastener parts extend through the oversized fastening apertures and fixedly engaged with the first fastener parts between an adjusting orientation and a securing orientation. The oversized fastening apertures have a prescribed dimension with respect to the first and second fastener parts such that the shifter base member is movable in a plurality of alignment directions relative to the vehicle floor portion when in the adjusting orientation. The console member includes a horizontal console portion arranged to at least partially cover the shifter base member and an inclined console portion arranged to at least partially cover an instrument panel. The horizontal console portion has a plurality of second alignment portions engaged with the first alignment portions such that the console member and the shifter base member move together as a single unit in the alignment directions while the first and second fastener elements are in the adjusting orientation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 13-18 are schematic top views of the shifter assembly installed on the floor portion showing various alignment directions in which the shifter assembly and the front console member can be moved to bring them into alignment with the portion of the instrument panel in accordance with one embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
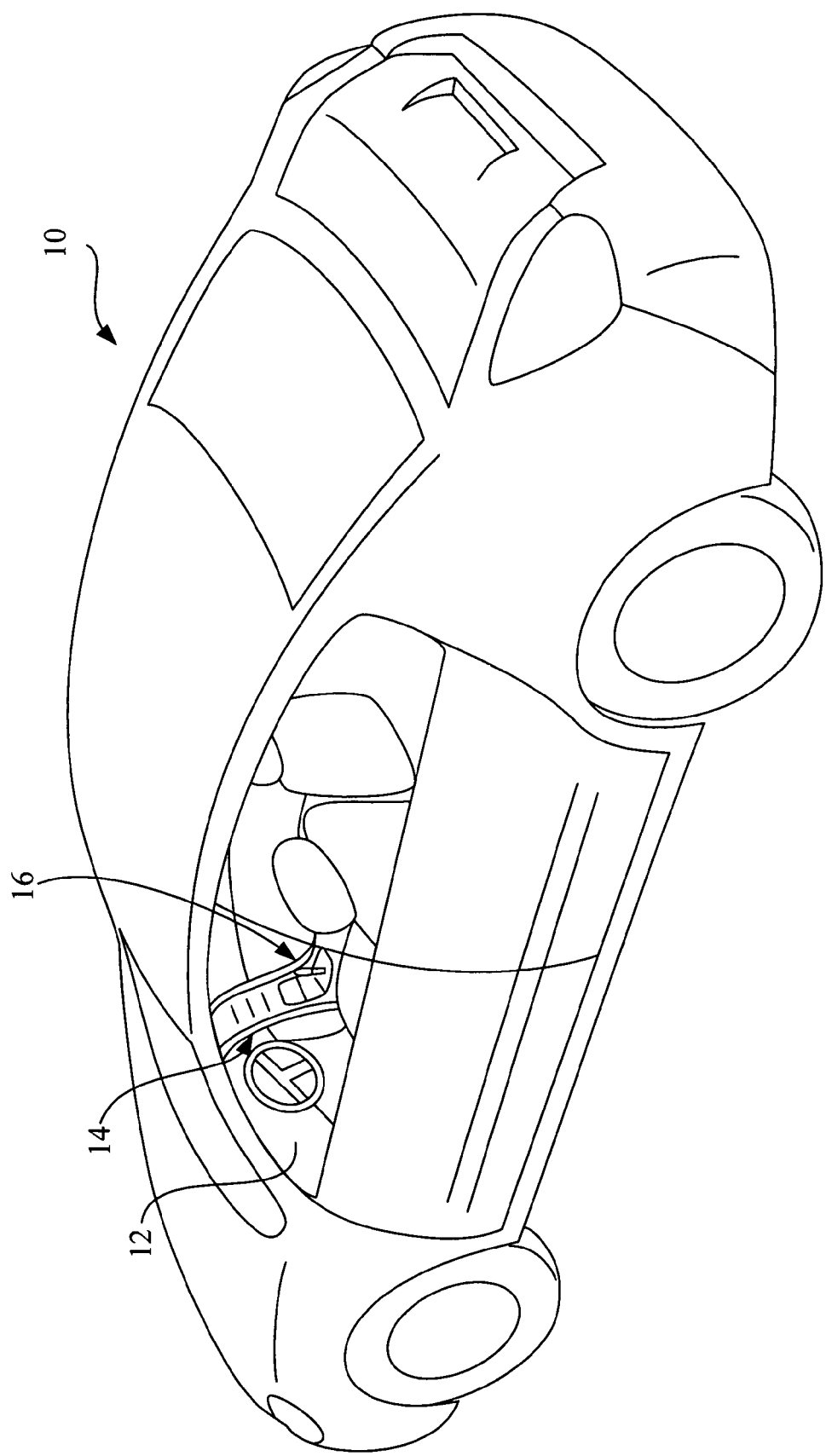
FIG. 1 is a perspective view of a vehicle that includes a console/shifter arrangement in accordance with the present invention.

Referring initially to FIG. 1, a vehicle 10 is illustrated in accordance with a first embodiment of the present invention. The vehicle 10 has vehicle console/shifter arrangement that includes a dashboard 12 with an instrument panel 14 and a console/shifter assembly 16 that is easily and flexibly positionable relative to features of the instrument panel 14 in a manner described in greater detail below.

Figure 2:
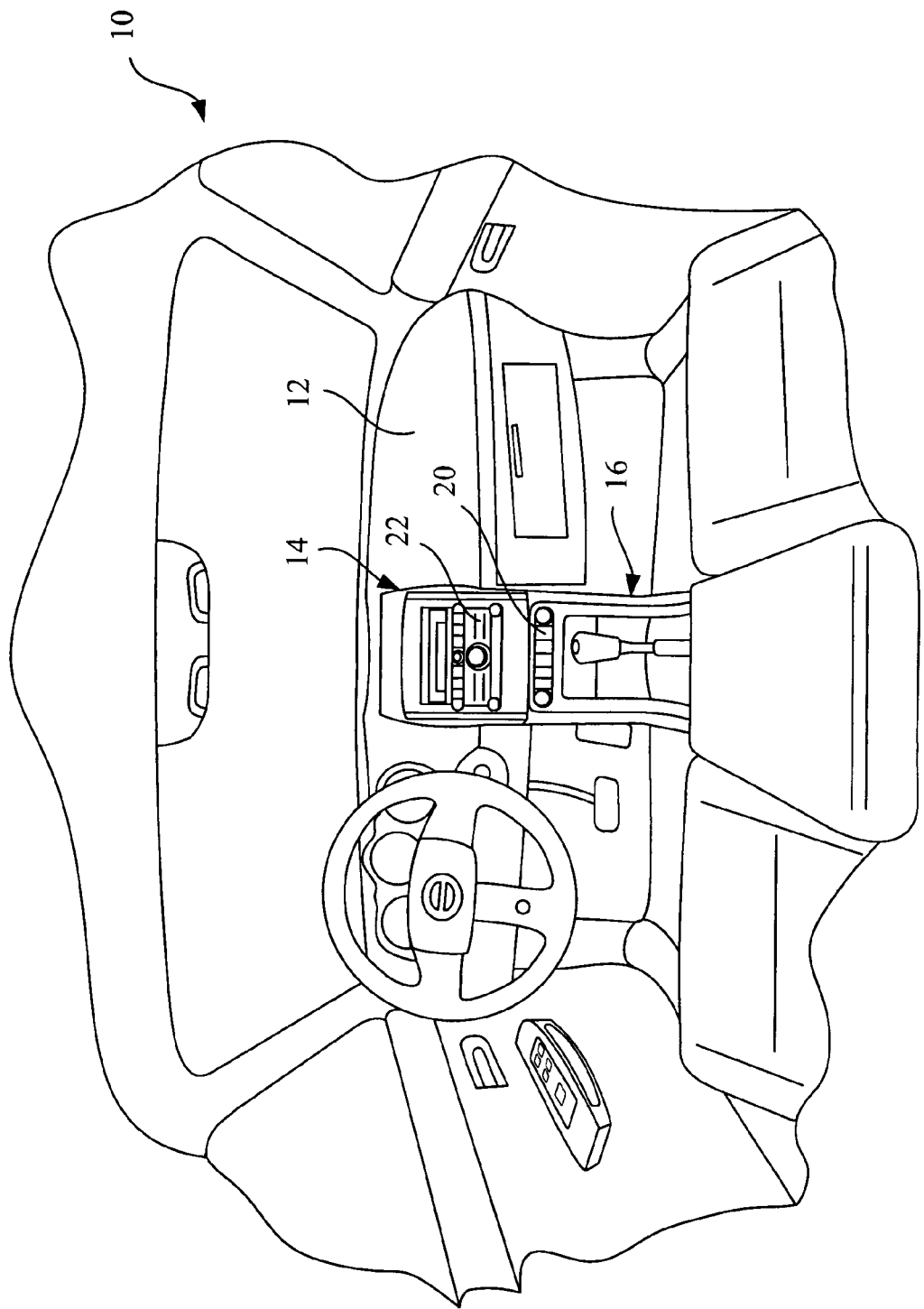
FIG. 2 is a perspective view of an interior of the vehicle depicted in FIG. 1, showing portions of the console/shifter arrangement, including an instrument panel, a center console and a shifter assembly in accordance with one embodiment of the present invention.
Figure 3:
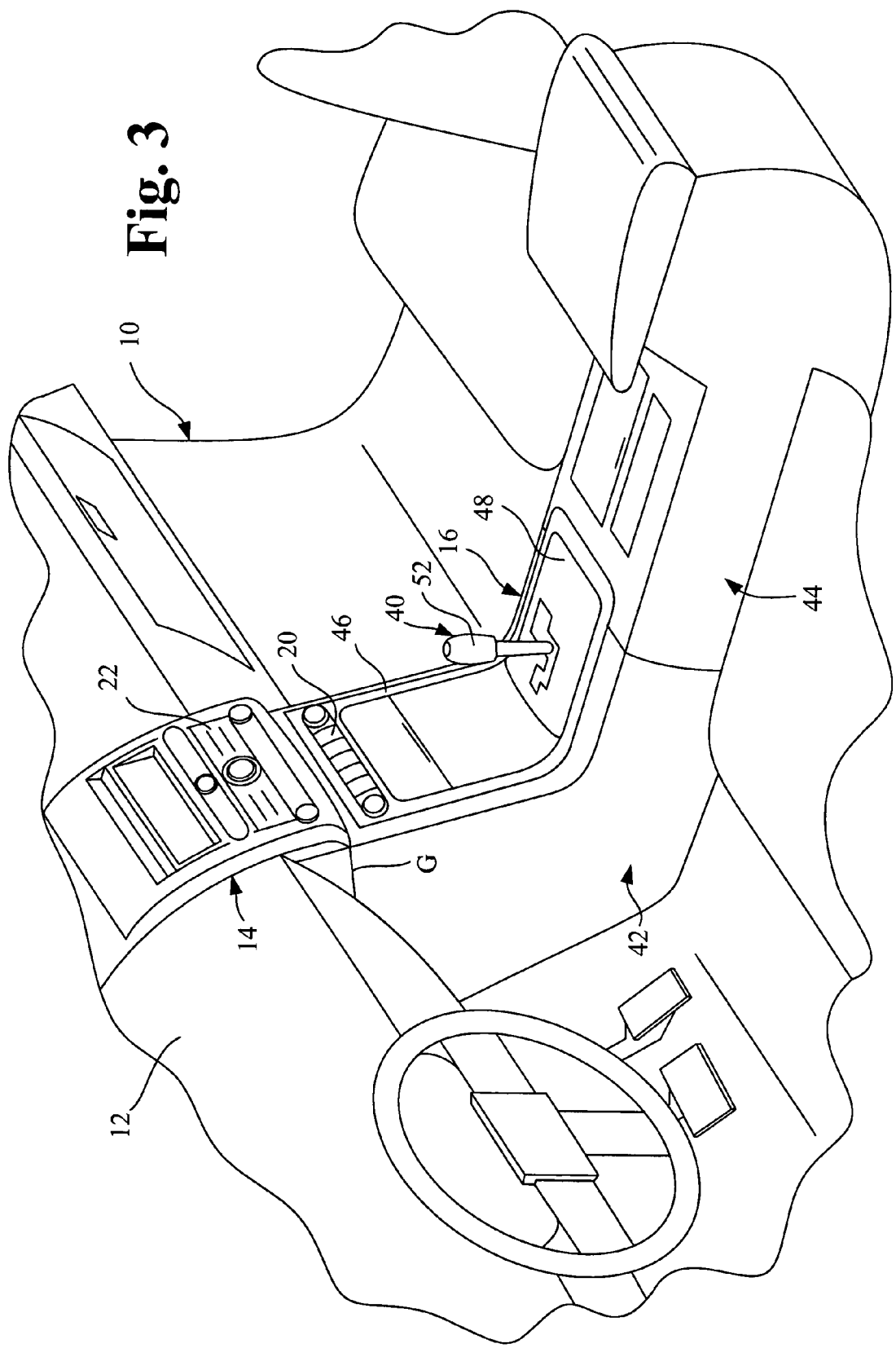
FIG. 3 is another perspective view of the interior of the vehicle showing the center console and the shifter assembly completely assembled in accordance with one embodiment of the present invention.

As shown in FIGS. 2 and 3, the instrument panel 14 includes a plurality of accessory control panels such as control panels 20 and 22 that can operate any of a variety of accessories within the vehicle 10 such as air conditioning, heating, defrosting, radio, CD player, hazard lights and other conventional accessories installed within the vehicle 10. The control panel 20 is positioned such that a portion of the console/shifter assembly 16 surrounds it in a manner described in greater detail below. The control panel 22 is positioned within the instrument panel 14.

Figure 4:
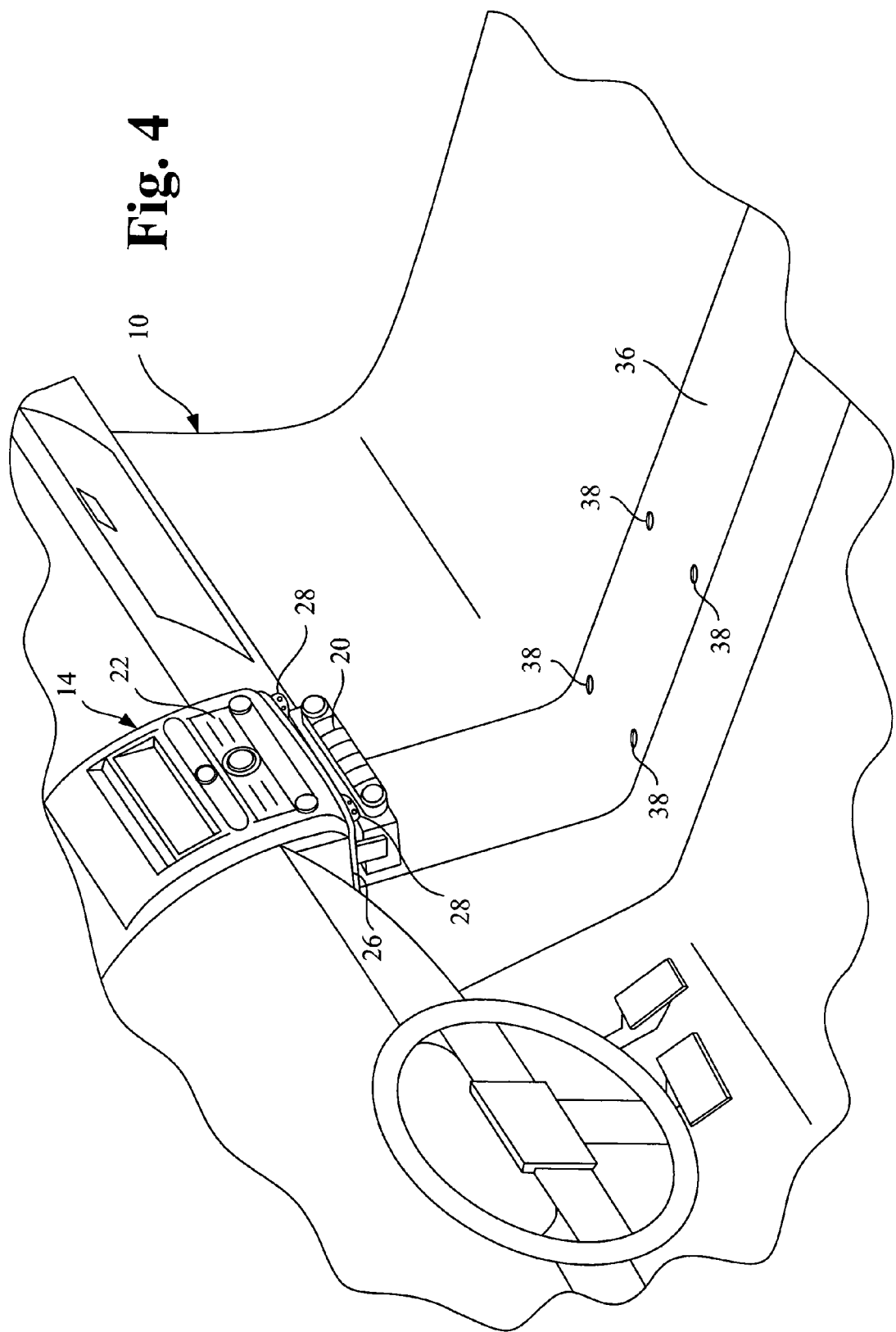
FIG. 4 is a perspective view of the interior of the vehicle similar to FIG. 3 showing a floor portion of the interior of the vehicle with the center console and the shifter assembly removed in accordance with one embodiment of the present invention.
Figure 6:
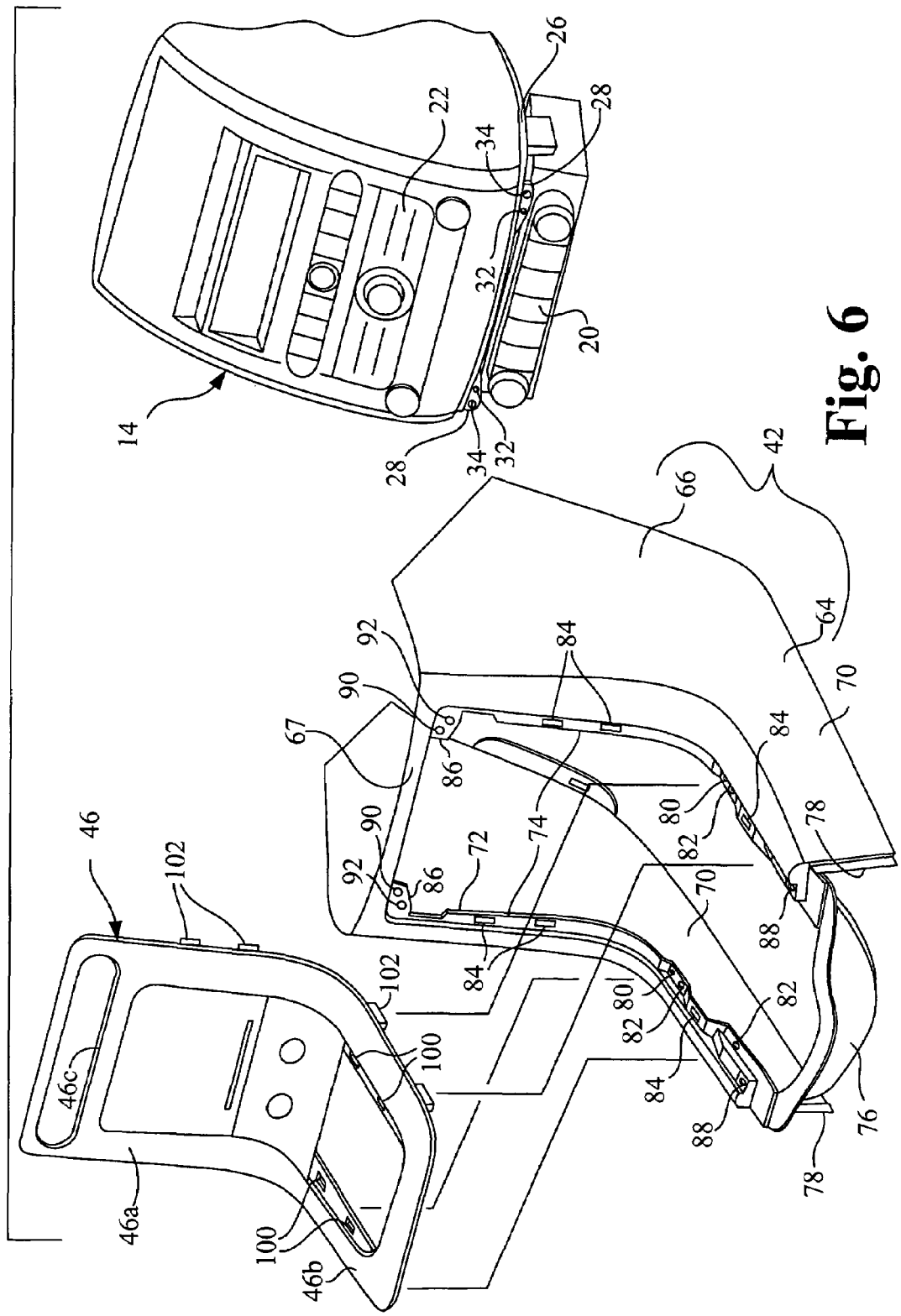
FIG. 6 is an exploded perspective view showing a portion of the instrument panel, a front console member of the center console and a wrap-around trim member removed from the vehicle in accordance with one embodiment of the present invention.

Referring now to FIGS. 4 and 6, the instrument panel 14 is described in greater detail. In FIG. 4, the interior of the vehicle 10 is depicted with the console/shifter assembly 16 and seats removed to provide greater detail. Among other things, the instrument panel 14 includes the accessory control panels 20 and 22, a mating flange 26 and attachment flanges 28. The accessory control panel 20 is mounted to the instrument panel 14 below a main portion of the instrument panel 14 such that the body of the accessory control panel 20 is spaced apart from the mating flange 26 of the instrument panel 14. The accessory control panel 22 is built into the instrument panel 14. The attachment flanges 28 extend downward from the main portion of the instrument panel 14 generally parallel to but spaced apart from a front face of the instrument panel 14.

The mating flange 26 extends around the lower periphery of the instrument panel 14. The mating flange 26 is offset or recessed inward from the instrument panel 14 and provides a surface that engages a portion of the front console member 42, as is described in greater detail below. The attachment flanges 28 are further disposed between the accessory control panels 20 and 22.

As shown more clearly in FIG. 6, each of the attachment flanges 28 includes a projection 32 and a threaded fastener aperture 34. The projections 32 serve as alignment pins for initial installation and placement of the console/shifter assembly 16. The threaded fastener aperture 34 provides a location for mechanical connection to the console/shifter assembly 16, as described in greater detail below.

Referring again to FIG. 4, the interior of the vehicle 10 includes a floor portion 36 that extends from below the instrument panel 14 back between the two front seats. The floor portion 36 is depicted as being raised above a remainder of the vehicle floor. However, it should be understood from the drawings and the description herein that the floor portion 36 can alternatively be level with the remainder of the vehicle floor.

Figure 20:
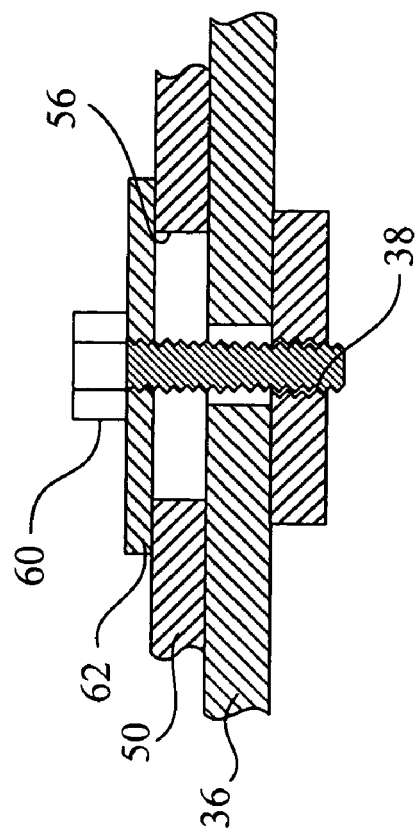
FIG. 20 is another cross-sectional view similar to FIG. 19, showing the fastener in a securing orientation.
Figure 19:
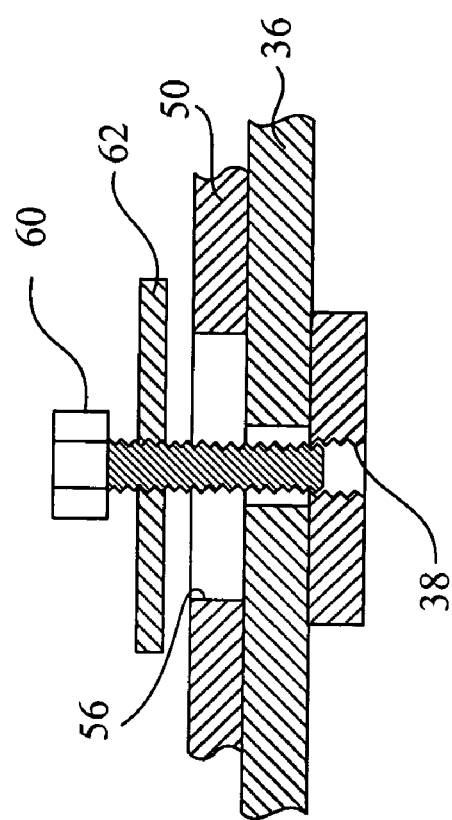
FIG. 19 is a cross-sectional view taken along the line 19-19 in FIG. 17, showing one of a plurality of fasteners connecting the shifter assembly to the floor portion, with the fastener in an adjusting orientation.

The floor portion 36 includes a plurality of threaded holes 38 (first fastener parts) that are spaced apart from one another in a first mounting pattern. The threaded holes 38 can be formed in any of a variety of ways. For example, a nut having threaded hole can be welded to the underside of the floor portion 36 in a conventional manner as shown in FIGS. 19 and 20. Alternatively, the floor portion 36 can be provided with sufficient thickness such that the threaded holes 38 are machined into the floor portion 36.

Figure 12:
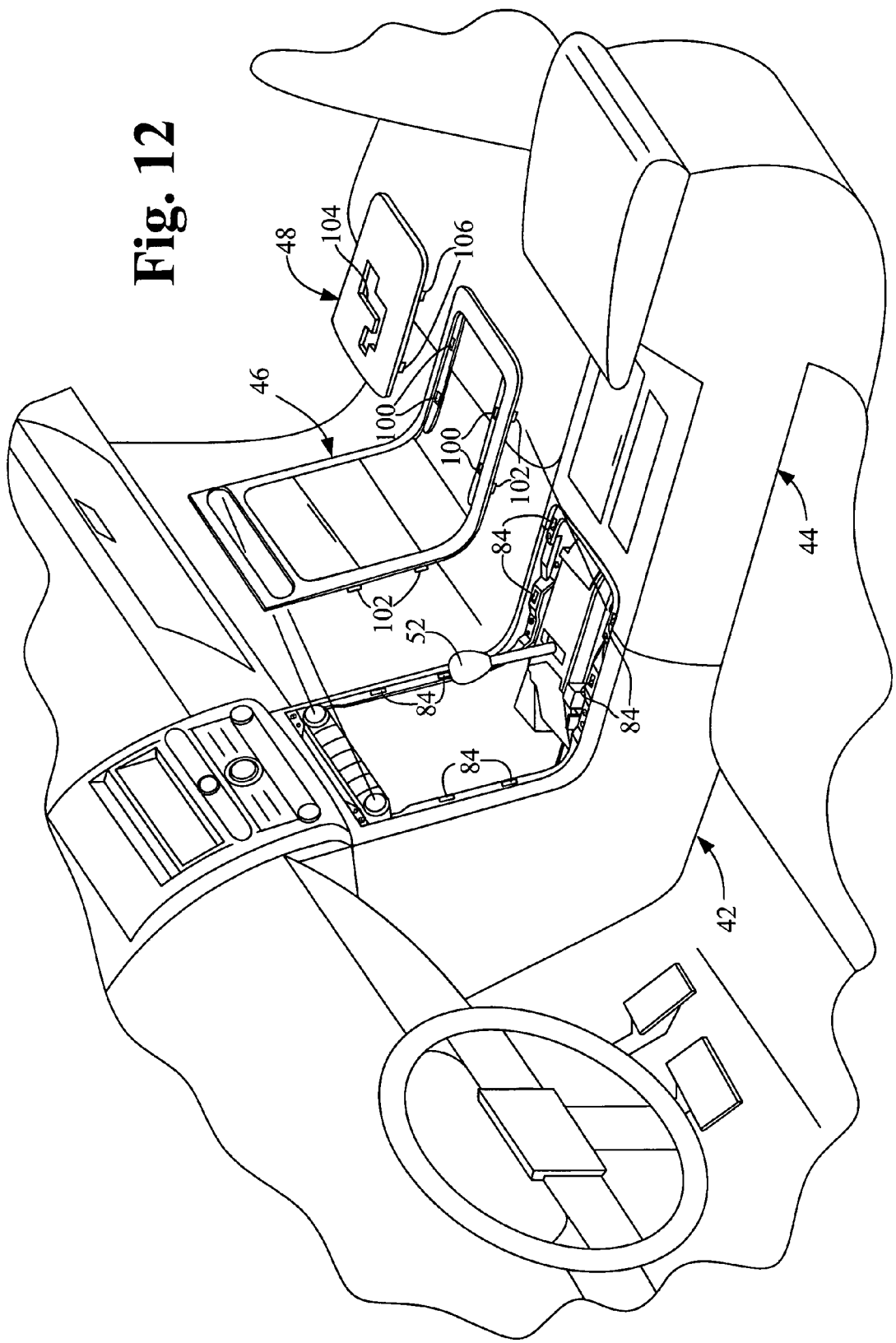
FIG. 12 is another perspective view similar to FIGS. 4, 8, 9 and 11 showing the wrap-around trim member and a shifter plate being installed in accordance with one embodiment of the present invention.

As indicated in FIG. 3, the console/shifter assembly 16 includes a shifter assembly 40 (shown separately in FIG. 5), a front console member 42 (shown in FIG. 6), a rear console member 44 (shown in FIG. 7), a wrap-around trim member 46 (shown in FIG. 6) and a shifter plate 48 (shown in FIG. 12).

Figure 5:
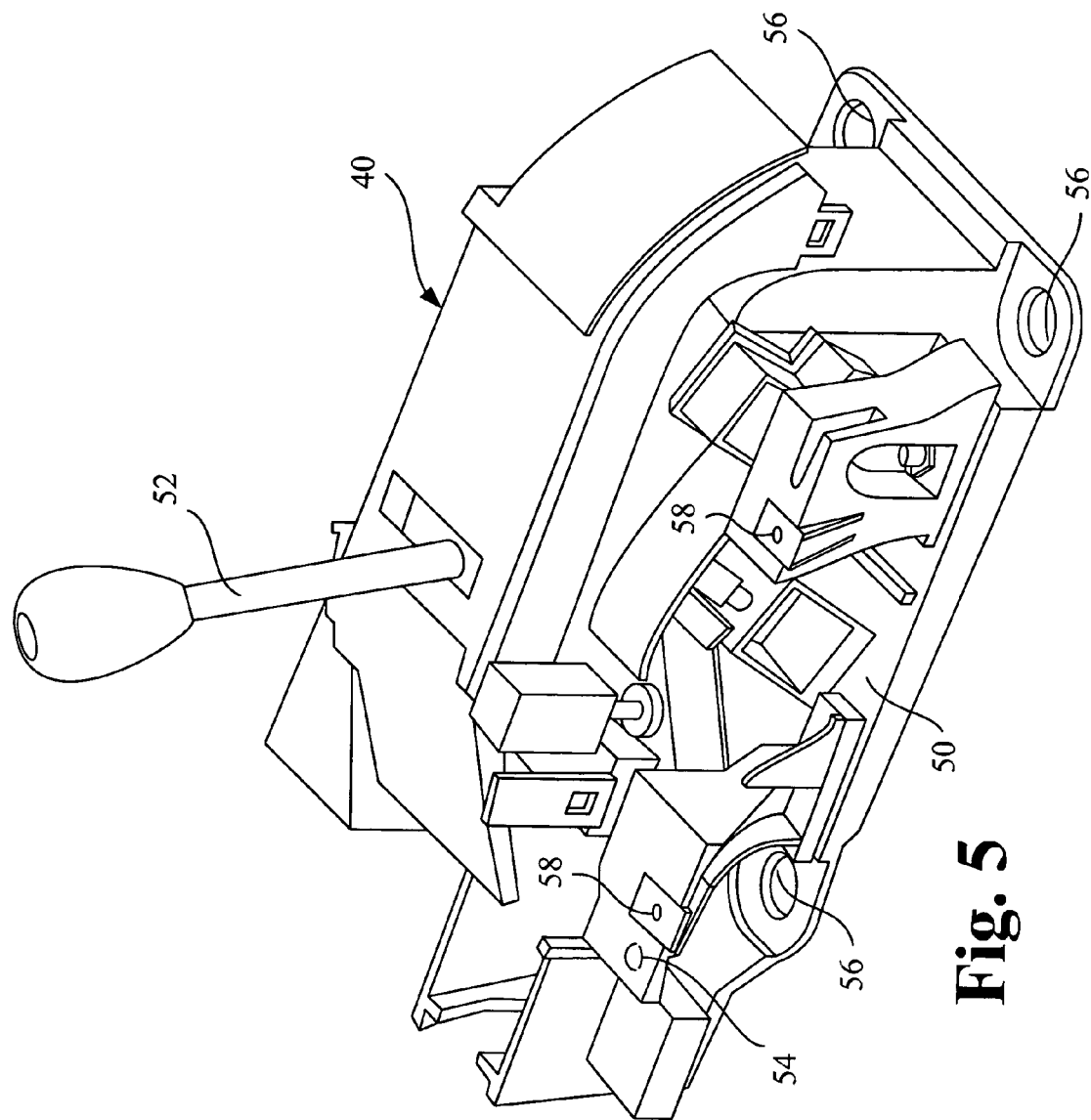
FIG. 5 is a perspective view of the shifter assembly removed from the vehicle showing portions of a shifter base member in accordance with one embodiment of the present invention.
Figure 10:
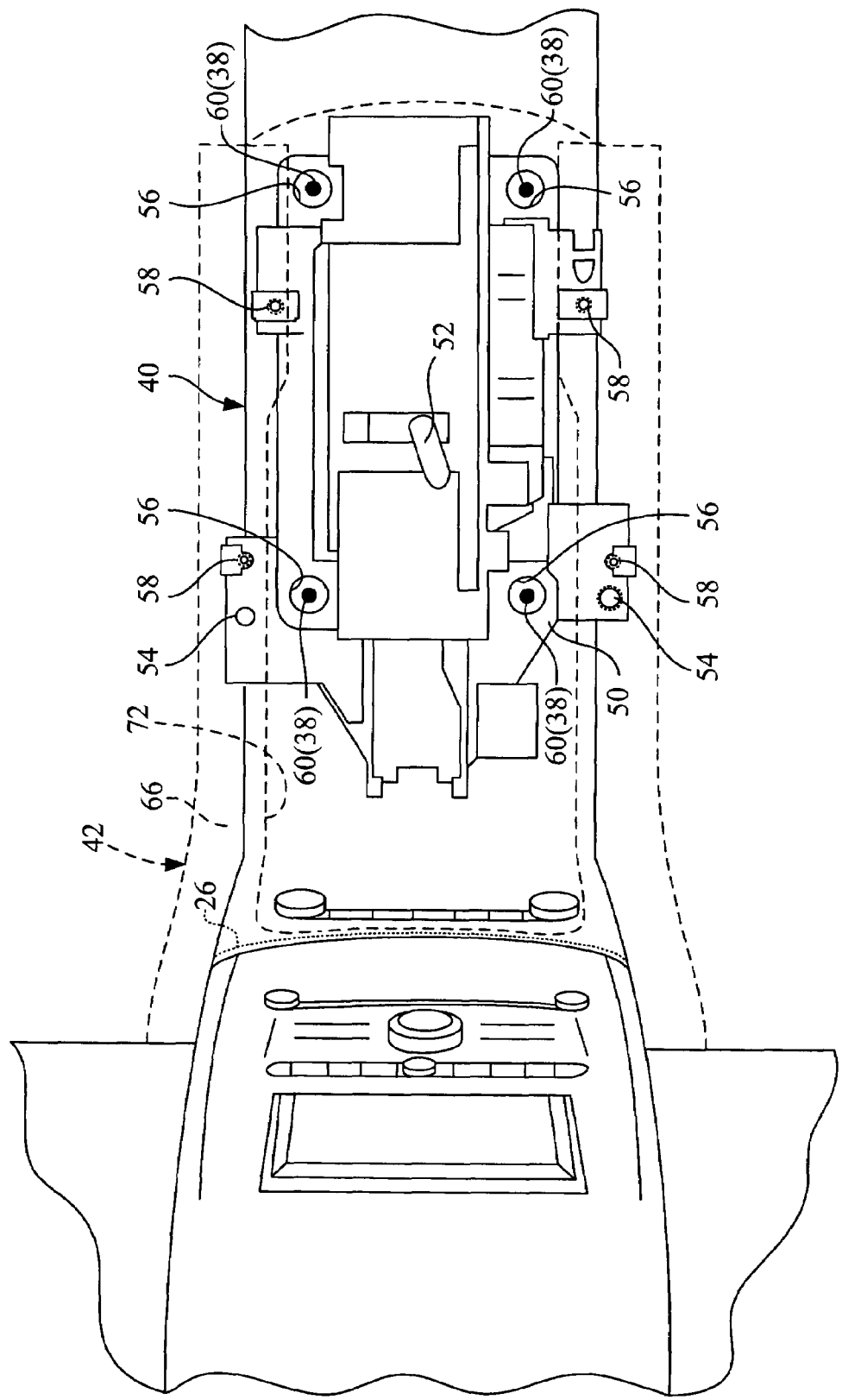
FIG. 10 is a top view of the shifter assembly, the front console member depicted in dashed lines and the portion of the instrument panel showing oversized apertures in the shifter base member and fasteners extending through the oversized apertures with the position of the front console member aligned with the portion of the instrument panel in accordance with one embodiment of the present invention.

As best shown in FIGS. 5 and 10, the shifter assembly 40 basically includes (among other things) a shifter base member 50 and a shifter mechanism that has a shifter lever 52. The shifter base member 50 includes a plurality of first alignment portions 54, a plurality of oversized fastening apertures 56 and a plurality of console attachment apertures 58. The first alignment portions 54 are pins or protrusions that extend upward from the adjacent surface of the shifter assembly 40. The oversized fastening aperture 56 are arranged in a second mounting pattern that aligns with the first mounting pattern of the threaded holes 38 of the floor portion 36 when the shifter base member 50 overlays the threaded holes 38.

The shifter assembly 40 connects to and/or include any of a variety of conventional shifter mechanism related elements, among other things, such as a shifter cable (not shown), a light (not shown) for illuminating the shifter plate 48 (FIGS. 3 and 12) and a locking mechanism (not shown) that prevents movement of the shifter lever 52 under prescribed circumstances.

Figure 8:
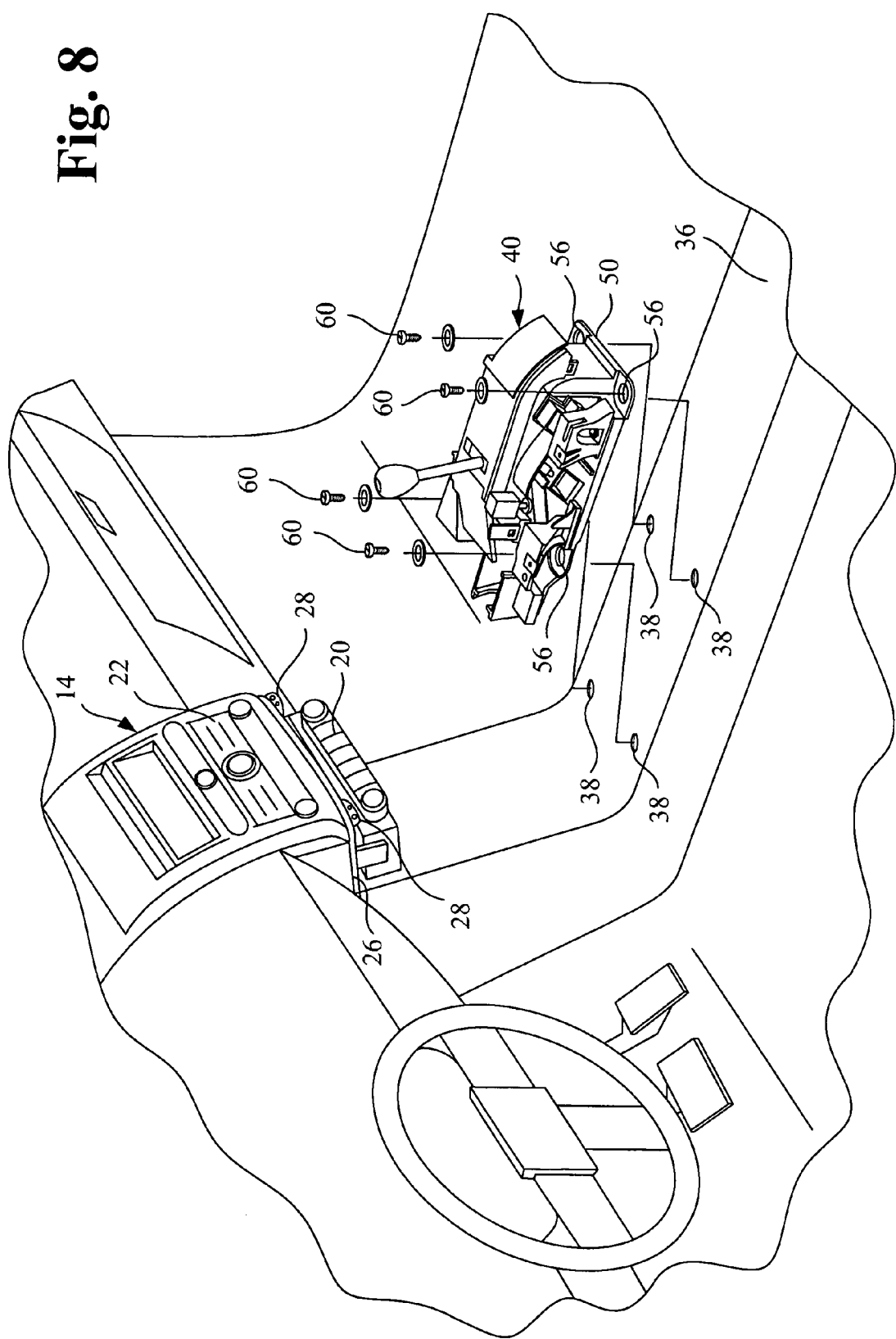
FIG. 8 is perspective view similar to FIG. 4 showing the shifter assembly being fitted to the floor portion in accordance with one embodiment of the present invention.

As best shown in FIG. 8, the shifter assembly 40 is installed to the floor portion 36 using a plurality of threaded fasteners 60 (second fastener parts) that are inserted to extend through the oversized fastening apertures 56 and fixedly engaged with the threaded holes 38 (the first fastener parts). Each of the threaded fasteners 60 includes an oversized washer 62. The threaded fasteners 60 are configured for movement between an adjusting orientation (shown in FIG. 19) and a securing orientation (shown in FIG. 20). The oversized fastening apertures 56 have a prescribed dimension with respect to the threaded holes 38 and the fasteners 60 (the first and second fastener parts) such that the shifter base member 50 and the shifter assembly 40 are movable in a plurality of alignment directions (shown in FIGS. 13-18) relative to the floor portion 36 when the fasteners 60 are in the adjusting orientation (FIG. 19), as described in greater detail below.

The oversized fastening apertures 56 in the shifter base member 50 have an inner diameter that is preferably at least three times an outer diameter of the threaded fasteners 60. The relationship between the size of the oversized fastening apertures 56 and the threaded fasteners 60 is based upon a variety of design and engineering criteria and is variable depending on those considerations and their various associated tolerances. More specifically, the oversized fastening apertures 56 in the shifter base member 50, the threaded holes 38 in the floor portion 36 and the threaded fasteners 60 are dimensioned such that the plurality of alignment directions (FIGS. 13-18) include limited forward and backward movement of the shifter base member 50, limited side to side movement of the shifter base member 50, and limited rotational movement of the shifter base member 50 relative to the vehicle floor portion 36. As well, the floor portion 36 is configured such that the alignment directions of the movement of the shifter base member 50 (and the console member 42) lie in a generally horizontal plane defined by the floor portion 36.

As best shown in FIG. 6, the front console member 42 basically includes a horizontal console portion 64 arranged to at least partially cover the shifter base member 40 and an inclined console portion 66 arranged to at least partially cover a portion of the instrument panel 14. Specifically, the inclined console portion 66 covers and forms a surround 67 that partially extends around the accessory control panel 20 leaving only the face of the accessory control panel 20 visible, as described in greater detail below.

The front console member 42 is made of any one or a combination of the following: plastic materials, polymer materials, metal materials and/or composite materials that are covered by an overly material such that the front console member 42 is aesthetically pleasing to match other interior portions of the vehicle 10, such as the dashboard 12. The front console member 42 is a center console configured for installation on the floor portion 36 extending at least partially between the front seats. The front console member 42 includes first and second side walls 70 that are approximately vertically oriented and are disposed on opposite sides of the shifter base member 42 with the horizontal console portion 64 and the inclined console portion 66 defined therebetween.

An upper surface opening 72 is formed between the first and second side walls 70 at an upper region of the front console member 42. The upper surface opening 72 extends along an upper region of both the horizontal console portion 64 and the inclined console portion 66. Inwardly protruding attachment flanges 74 are disposed on opposite sides of the upper surface opening 72 and extend longitudinally along the sides of the upper surface opening 72 and further along both the horizontal console portion 64 and the inclined console portion 66. A rearward end of the front console member 42 includes a support flange 76 that extends between the side walls 70. Below the support flange 76 are parallel engagement flanges 78 that extend downward from opposite ends of the support flange 76 along a back edge of the side walls 70.

The attachment flanges 74 are generally symmetrical and therefore description of one applies to both. As shown in FIG. 6, each attachment flange 74 includes an alignment aperture 80 (a second alignment portion), a plurality of fastener apertures 82, a plurality of slots 84, a fastener projection 86 and rear console attachment apertures 88.

The alignment apertures 80 (the second alignment portion) are dimensioned and positioned to receive the first alignment portions 54 on the shifter base member 50 in a manner described in greater detail below. The fastener apertures 82 are dimensioned and positioned to align with the console attachment apertures 58 on the shifter base member 50, as is also described in greater detail below. The slots 84 provide attachment apertures for installation of the wrap-around trim member 46, as described in greater detail below.

The fastener projections 86 each include an aperture 90 and a fastener hole 92. The apertures 90 are positioned to receive a corresponding one of the projections 32 of the attachment flanges 28 of the instrument panel 14. Further, the projections 32 (serving as third alignment portions) are configured to extend into the apertures 90 (serving as fourth alignment portions) provide a simple means for initial alignment of the front console member 42 with the mating flange 26 of the instrument panel 14. The fastener holes 92 are positioned to align generally with the threaded fastener aperture 34 for fixing the console member 42 to the instrument panel 14, as is described in greater detail below.

Figure 7:
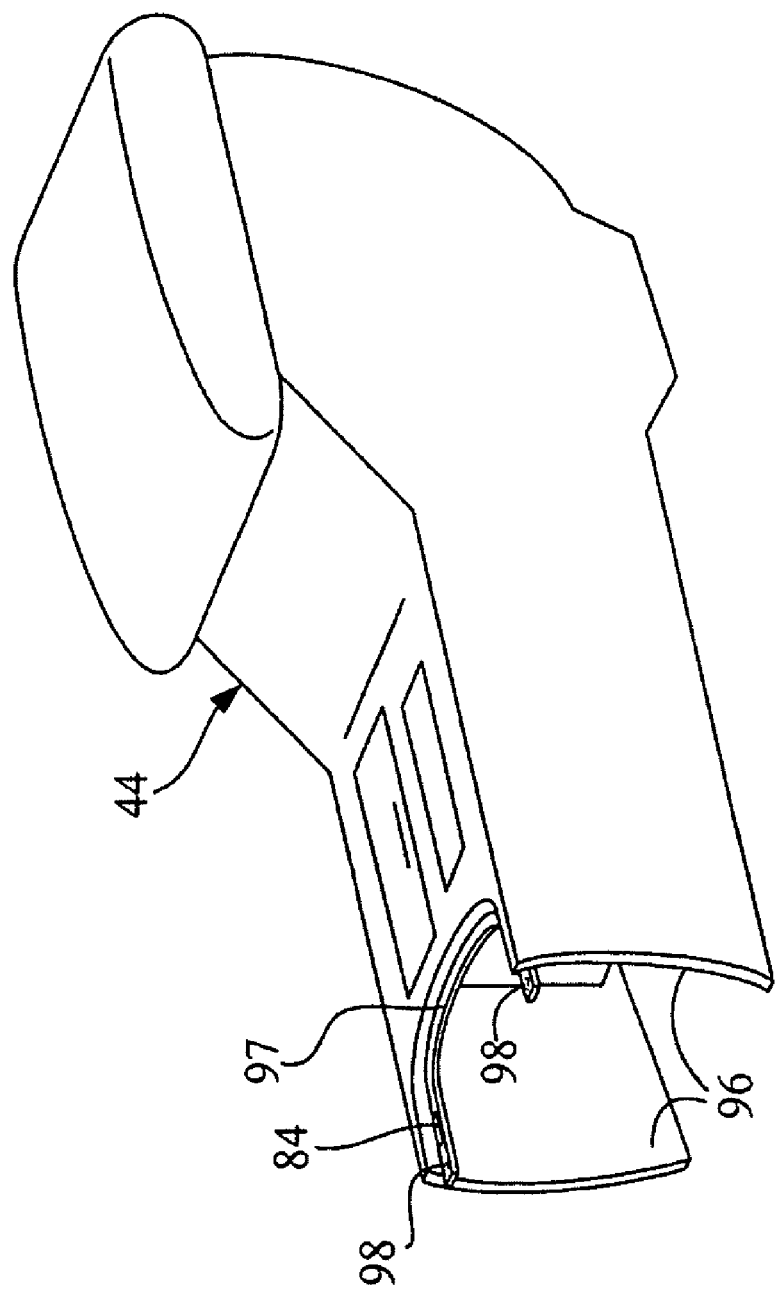
FIG. 7 is a perspective view of a rear console member of the center console shown removed from the vehicle in accordance with one embodiment of the present invention.

With reference to FIG. 7, a description of the rear console member 44 is now provided. The rear console member 44 is shaped and configured to combine with the front console member 42 to form a single center console assembly that extends between front seats of the vehicle 10. The rear console member 44 is preferably constructed of the same materials as the front console member 42. The rear console member 44 can include an arm rest, a storage compartment (not shown) and a variety of other conventional features (not shown). The rear console member 44 basically includes side walls 96 and an attachment flange 97. The side walls 96 are shaped to conform to and mate with the engagement flanges 78 located at the rearward end of the front console member 42, as is described in greater detail below. The attachment flange 97 of the rear console member 44 is offset below the outer surface of the rear console member 44 and has U-shape that includes attachment apertures 98 and two of the slots 84.

The wrap-around trim member 46 is a ring-like trim member that includes an inclined trim portion 46a, a horizontal trim portion 46b and an opening 46c. The inclined trim portion 46a corresponds to the inclined console portion 66 and the horizontal trim portion 46b corresponds to the horizontal console portion 64. The opening 46c is dimensioned to receive the exposed portion of the control panel 20. However, it should be understood from the drawings and the description herein that the control panel 20 can alternatively be installed directly to the wrap-around trim member 46 such that the control panel 20 and the wrap-around trim member 46 are a single unit. In this alternative configuration, after installation of the wrap-around trim member 46 (with the attached control panel 20), the control panel 20 can be connected electronically to a wiring harness (not shown) under the instrument panel 14.

The wrap-around trim member 46 is formed with a decorative surface on an outer side thereof, an inwardly projecting flange with slots 100 and a plurality of attachment projections 102 on a hidden side thereof. The slots 100 provide an attachment opening for securing the shifter plate 48, as is described in greater detail below. The horizontal trim section 46b is shaped to be installed on the horizontal console portion 64. Once installed on the front console member 42, the horizontal trim section 46b conceals the fasteners 60 (the second fastener parts). The inclined trim section 46a is arranged to at least partially encircle the accessory control panel 20 (a component of the instrument panel 14).

As shown in FIG. 12, the shifter plate 48 is a cover plate that includes a shifter slot 104 and projections 106. Once installed on the wrap-around trim member 46, the shifter lever 52 extends through the shifter slot 104. The projections 106 are dimensioned to fit into the slots 100 in the wrap-around trim member 46 and are secured thereto.

With initial reference to FIG. 8, a description of a method of assembling the console shifter assembly 16 (a vehicle console/shifter arrangement) in accordance with the present invention is now provided. As shown in FIG. 8, the shifter assembly 40 is positioned above the floor portion 36. The fasteners 60 are installed in the oversized washers 62, passed through respective ones of the oversized fastening apertures 56 in the shifter base member 50 and then threaded into respective ones of the threaded holes 38 in the floor portion 36.

Figure 9:
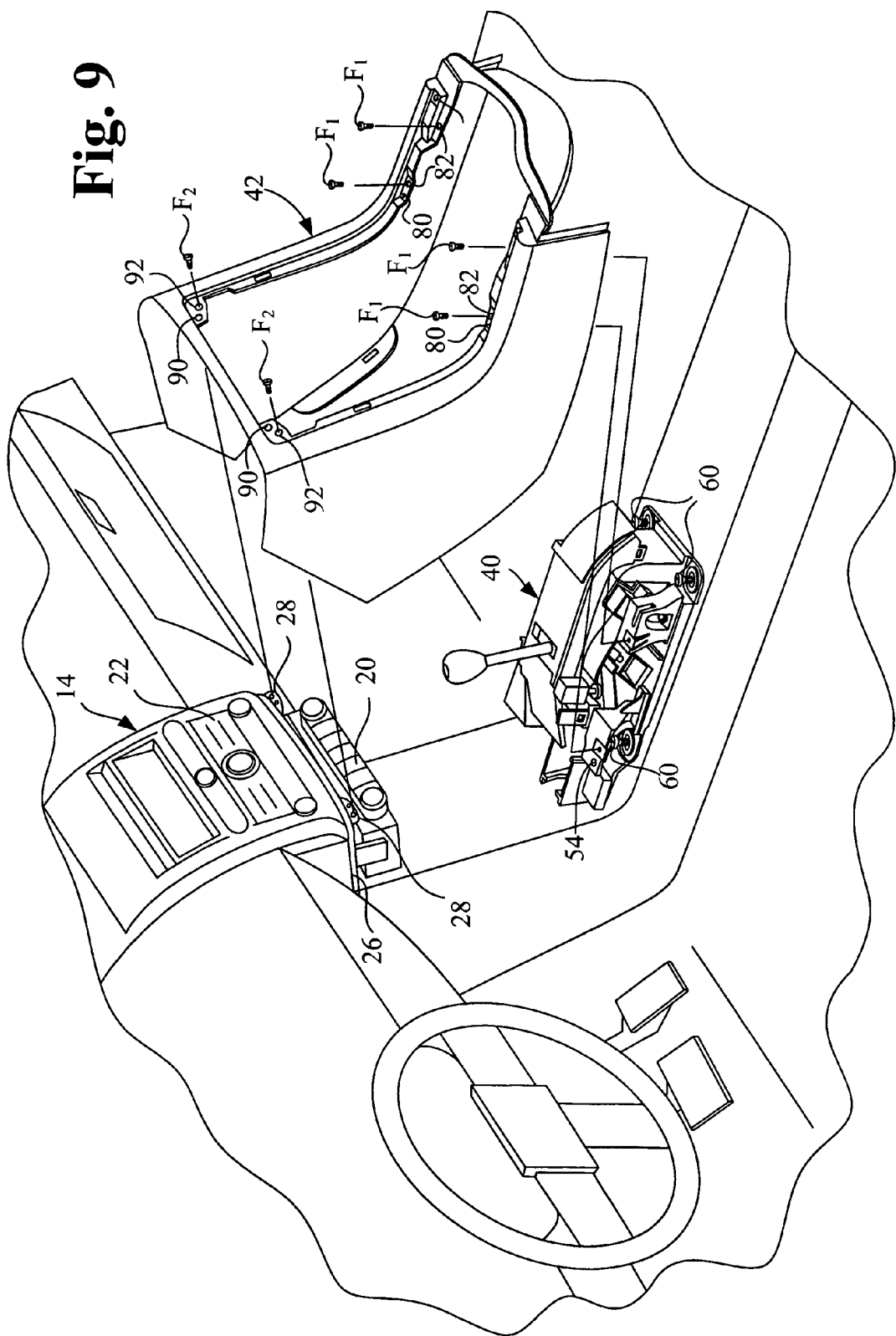
FIG. 9 is another perspective view similar to FIGS. 4 and 8 showing the front console member being installed around the shifter assembly and the portion of the instrument panel in accordance with one embodiment of the present invention.
Figure 11:
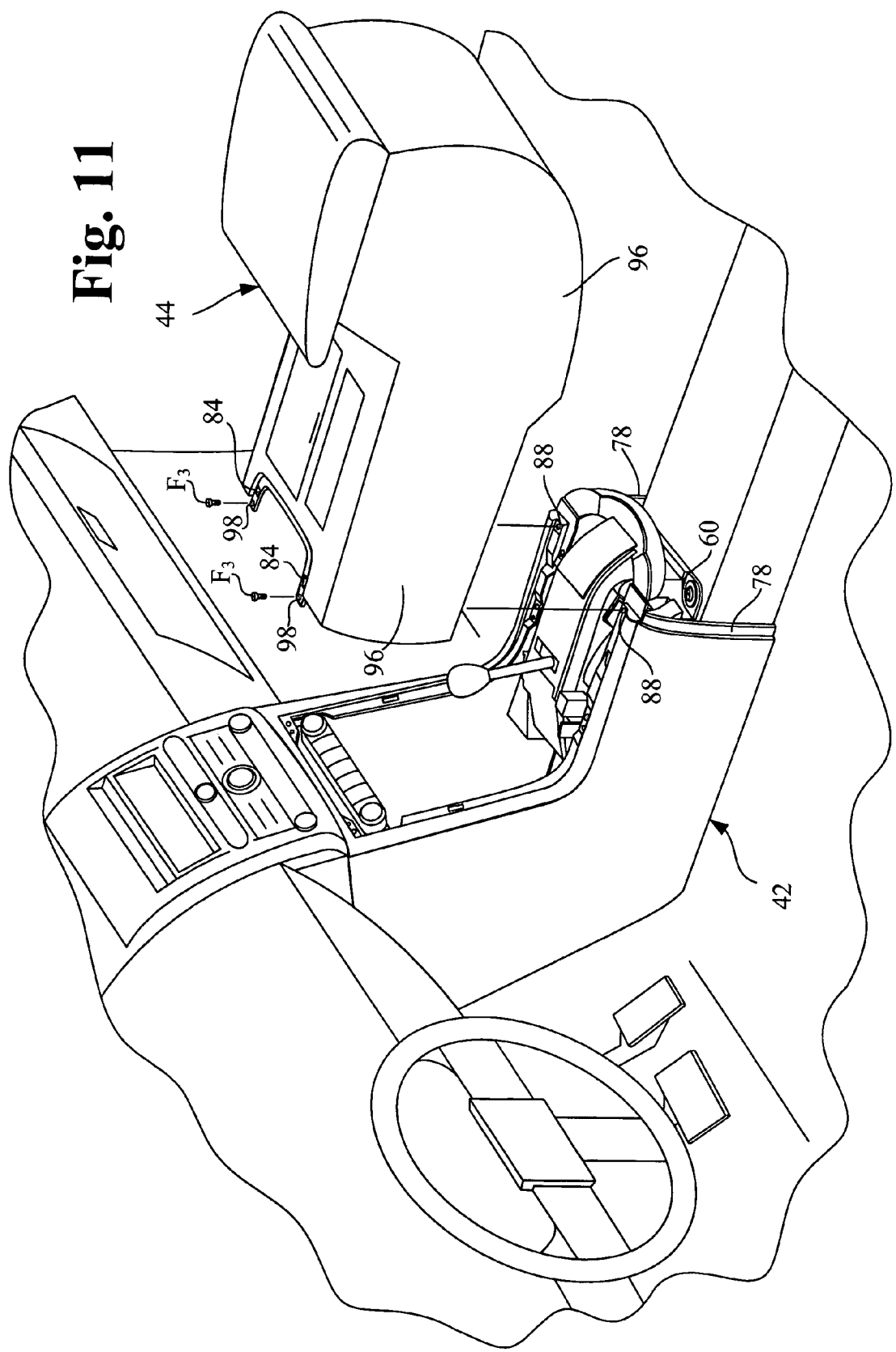
FIG. 11 is another perspective view similar to FIGS. 4, 8 and 9 showing the rear console member being installed in the vehicle in accordance with one embodiment of the present invention.

As shown in FIGS. 9 and 19, the fasteners 60 are not tightened, but rather are left loose in an adjusting orientation. Since the oversized fastening apertures 56 are several times the diameter of the fasteners 60, position of the shifter assembly 40 can be adjusted as described below. Also shown in FIG. 9, the front console member 42 is positioned above the shifter assembly 40 and then placed above and around the shifter assembly 40 as shown in FIG. 11.

Referring again to FIG. 9, as the front console member 42 is installed on the shifter assembly 40, the alignment apertures 80 (the second alignment portions) are positioned over the first alignment portions 54. Specifically, since the first alignment portions 54 of the shifter base member 50 are projections, they extend into the alignment apertures 80 (the second alignment portions) and serve as positioning guides. Consequently, the position of the front console member 42 relative to the shifter assembly 40 is easy and simple to determine by the engagement between the alignment apertures 80 and the first alignment portions 54. Thereafter, the fasteners $F_1$ are inserted through the fastener apertures 82 in the front console member 42 and further threaded into the console attachment apertures 58 in the shifter base member 50 of the shifter assembly 40.

Once the fasteners $F_1$ are tightened, the front console member 42 and the shifter assembly 40 are secured to one another. With the alignment apertures 80 (the second alignment portions) engaged with the first alignment portions 54 and the fasteners $F_1$ secured, the front console member 42 and the shifter assembly 40 move together as a single unit in the alignment directions while the fasteners 60 are in the adjusting orientation. With the front console member 42 installed on the shifter assembly 40, the shifter lever 52 extends above the horizontal console portion 64 of the front console member 42.

Referring now to FIGS. 3, 10 and 13-18, the adjustment of the position of the front console member 42 and the shifter assembly 40 relative to the floor portion 36 is now described. In order to provide an aesthetically pleasing appearance, the upper edge of the inclined console portion 66 of the front console member 42 overlays the mating flange 26 with a predetermined gap G (shown in FIG. 3). In other words, the upper edge of the inclined console portion 66 of the front console member 42 preferably covers the majority of the mating flange 26. In order to provide a smooth appearance, the gap G between the instrument panel 14 and the front console member 42 is either visually determined or mechanically measured to ensure that the gap G is uniform along the length of the overlap.

Since the front console member 42 and the shifter assembly 40 move together as a single unit, with the fasteners 60 in the adjusting orientation, the position of the front console member 42 and the shifter assembly 40 are simply and easily adjusted. Further, the inclined console portion 66 of the front console member 42 includes the apertures 90 (third alignment portions) that are configured for engagement with the projections 32 (fourth alignment portions) in the instrument panel 14. Therefore, the position of the front console member 42 (and the shifter assembly 40) are initially manipulated to put the projections 32 of the attachment flanges 28 of the instrument panel 14 into the apertures 90 of the attachment flanges 74 of the front console member 42, as indicated in FIG. 9. Once the projections 32 are inserted into the apertures 90, the gap G can be adjusted and fine tuned to achieve a desired dimension and an aesthetically pleasing appearance.

For example, as indicated in FIG. 13, the shifter assembly 40 (and front console member 42) can be moved rearward slightly to achieve the desired gap G. As indicated in FIG. 14, the shifter assembly 40 (and front console member 42) can be moved forward slightly to achieve the desired gap G. As indicated in FIGS. 15 and 18, the shifter assembly 40 (and front console member 42) can be rotated slightly clockwise or counterclockwise to achieve the desired gap G. Similarly, as indicated in FIGS. 16 and 17, the shifter assembly 40 (and front console member 42) can be moved to the right or left to achieve the desired gap G.

Once the desired dimension of the gap G has been achieved, the fasteners 60 can be tightened, as shown in FIG. 20. As shown in FIG. 10, the upper surface opening 72 is sufficiently large to allow all four fasteners 60 to be tightened, thereby fixing the shifter assembly 40 and the front console member 42 in position relative to the floor portion 36 and the instrument panel 14. Further, the fasteners $F_2$ (shown in FIG. 9) can be installed before, after or while the fasteners 60 are being tightened. Specifically as indicated in FIG. 9, the fasteners $F_2$ are inserted through the fastener holes 92 and threaded into the threaded fastener apertures 34. Preferably, the fasteners $F_2$ are not tightened until after the gap G has been set.

As shown in FIG. 11, the rear console member 44 is installed to the rear edge 68 of the front console member 42. Specifically, the side walls 96 are configured to engage and cover the engagement flanges 78 of the front console member 42. Fasteners $F_3$ are inserted through the apertures 98 in the rear console member 44 and threaded into the rear console attachment apertures 88 of the front console member 42.

It should be understood from the drawings and the description herein that the rear console member 44 can be installed before or after the adjustment of the gap G and the final position of the shifter assembly 40 and the front console member 42. Further, the rear console member 44 can be provided with additional fasteners (not shown) that fix the rear console member 44 to the floor portion 36.

As shown in FIG. 12, the front and rear console members 42 and 44 are configured to receive and support the wrap-around trim member 46 (a ring-like trim element) that is shaped to surround the shifter lever 52 and the accessory control panel 22 (a component of the instrument panel 14). Specifically, the projections 102 of the wrap-around trim member 46 are inserted into the slots 84 formed in both the front and rear console members 40 and 42 and snap fitted in place. Last, the projections 106 of the shifter plate 48 are inserted into the slots 100 of the wrap-around trim member 46 and snap fitted into place with the shifter lever 52 extending through the shifter slot 104 as shown in FIG. 3.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle console/shifter arrangement comprising:
a vehicle floor portion having a plurality of first fastener parts spaced apart from one another in a first mounting pattern;
a shifter base member having a plurality of first alignment portions and a plurality of oversized fastening apertures arranged in a second mounting pattern that align with the first mounting pattern;
a plurality of second fastener parts installed to and engaged with the first fastener parts of the vehicle floor portion and extending through the oversized fastening apertures for movement between an adjusting orientation and a securing orientation, the oversized fastening apertures having a prescribed dimension with respect to the first and second fastener parts such that the shifter base member is movable in a plurality of alignment directions relative to the vehicle floor portion when the second fastener parts are in the adjusting orientation; and
a console member including a horizontal console portion arranged to at least partially cover the shifter base member and an inclined console portion arranged to at least partially cover an instrument panel, the horizontal console portion having a plurality of second alignment portions engaged with the first alignment portions such that the console member and the shifter base member move together as a single unit in the alignment directions while the second fastener parts are in the adjusting orientation.

2. The vehicle console/shifter arrangement as set forth in claim 1, wherein
the inclined console portion of the console member includes third alignment portions configured for engagement with fourth alignment portions in the instrument panel.

3. The vehicle console/shifter arrangement as set forth in claim 1, wherein
the first fastener parts include a plurality of threaded apertures formed in the vehicle floor portion, and
the second fastener parts each include a threaded bolt configured to extend through the fastening apertures in the shifter base member and into the threaded apertures.

4. The vehicle console/shifter arrangement as set forth in claim 3, wherein
the fastening apertures in the shifter base member have an inner diameter that is at least two times an outer diameter of the threaded bolts.

5. The vehicle console/shifter arrangement as set forth in claim 1, wherein
the fastening apertures in the shifter base member and the first and second fastener parts are dimensioned such that the plurality of alignment directions include limited forward and backward movement of the shifter base member, limited side to side movement of the shifter base member, and limited rotational movement of the shifter base member relative to the vehicle floor portion.

6. The vehicle console/shifter arrangement as set forth in claim 1, wherein
the first alignment portions of the shifter base member each include a projection and a first fastener opening, the second alignment portions in the console member each include a projection receiving opening and a second fastener opening, the projection receiving openings being configured to receive corresponding ones of the projections, and the first and second fastener openings configured to receive corresponding fasteners.

7. The vehicle console/shifter arrangement as set forth in claim 1, wherein
the shifter base member supports a shifter lever that extends upwardly therefrom and above the horizontal console portion of the console member.

8. The vehicle console/shifter arrangement as set forth in claim 7, further comprising:
the console member is configured to receive and support a trim element shaped to at least partially surround the shifter and a component of the instrument panel.

9. The vehicle console/shifter arrangement as set forth in claim 1, further comprising:
a trim element having a horizontal trim section and an inclined trim section installed on the console member, the horizontal trim section being installed on the horizontal console portion arranged to conceal the second fastener parts and the inclined trim section being arranged to at least partially encircle a component of the instrument panel.

10. The vehicle console/shifter arrangement as set forth in claim 1, wherein
the vehicle floor portion is configured such that the alignment directions of movement of the shifter base member and the console member lie in a generally horizontal plane.

11. The vehicle console/shifter arrangement as set forth in claim 1, wherein
the console member is a center console configured for installation on the vehicle floor portion extending at least partially between a pair of front seats.

12. The vehicle console/shifter arrangement as set forth in claim 1, wherein
the console member includes first and second side walls that are approximately vertically oriented and are disposed on opposite sides of the shifter base member.

13. The vehicle console/shifter arrangement as set forth in claim 12, wherein each of the first and second side walls extend along opposite sides of the horizontal console portion and the inclined console portion.

14. A vehicle component assembly method comprising:
installing a shifter base member to a vehicle floor portion such that the shifter base member can undergo limited movement in a plurality of alignment directions relative to the vehicle floor portion;
installing fasteners to the vehicle floor portion for movement between an adjustment orientation and a securing orientation such that the fasteners extend through fastening apertures in the shifter base member with the fasteners in the adjustment orientation, the fastening apertures dimensioned to allow adjustment of the position of the shifter base member relative to the vehicle floor portion;
installing a console member to the shifter base member such that the shifter base member and the console member move as a single unit;
adjusting the position of the shifter base member and the console member by moving them within the alignment directions to a prescribed orientation within the vehicle with the fasteners installed in the adjustment orientation; and
fixing the shifter base member and console member in the prescribed orientation to the vehicle floor portion by moving the fasteners to the securing orientation.

15. The vehicle component assembly method as set forth in claim 14, wherein the adjusting of the position of the shifter base member and the console member includes aligning the shifter base member and the console member with at least one feature of all instrument panel.

16. The vehicle component assembly method as set forth in claim 14, wherein the adjusting of the position of the shifter base member and the console member within the plurality of alignment directions include at least limited forward and backward movement of the shifter base member and console member.

17. The vehicle component assembly method as set forth in claim 14, wherein the adjusting of the position of the shifter base member and the console member within the plurality of alignment directions include at least limited rotational movement of the shifter base member and console member.

18. The vehicle component assembly method as set forth in claim 14, wherein the adjusting of the position of the shifter base member and the console member within the plurality of alignment directions include at least limited side to side movement of the shifter base member and console member.

19. The vehicle component assembly method as set forth in claim 14, further comprising:
installing a trim element having a horizontal trim section and an inclined trim section, the inclined trim section being installed on an inclined console portion of the console member and the horizontal trim section encircling a shifter lever supported on the shifter base member.

20. The vehicle console/shifter arrangement as set forth in claim 10, wherein the plurality of second fastener parts are installed to the first fastener parts such that the plurality of second fastener parts are parallel to one another and perpendicular to the generally horizontal plane.

21. The vehicle console/shifter arrangement as set forth in claim 1, wherein the plurality of second fastener parts are installed to the first fastener parts such that the plurality of second fastener parts are parallel to one another and perpendicular to a generally horizontal plane defined by an adjacent portion of the vehicle floor portion.

22. The vehicle component assembly method as set forth in claim 14, wherein the installing of the fasteners to the vehicle floor portion includes installing the fasteners in a direction that is perpendicular to a plane defined by the vehicle floor portion.

* * * * *